US008906567B2

(12) United States Patent
Hasegawa et al.

(10) Patent No.: US 8,906,567 B2
(45) Date of Patent: Dec. 9, 2014

(54) FUEL CELL SYSTEM

(75) Inventors: Takahiko Hasegawa, Toyota (JP); Nobuyuki Kitamura, Minamitsuru-gun (JP); Kota Manabe, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 616 days.

(21) Appl. No.: 13/258,146

(22) PCT Filed: Jun. 8, 2009

(86) PCT No.: PCT/JP2009/060446
§ 371 (c)(1),
(2), (4) Date: Sep. 21, 2011

(87) PCT Pub. No.: WO2010/143250
PCT Pub. Date: Dec. 16, 2010

(65) Prior Publication Data
US 2012/0019068 A1    Jan. 26, 2012

(51) Int. Cl.
*H01M 8/04* (2006.01)
*H01M 16/00* (2006.01)
*B60L 11/18* (2006.01)
*B60L 3/00* (2006.01)

(52) U.S. Cl.
CPC ........ *H01M 8/04589* (2013.01); *B60L 11/1881* (2013.01); *B60L 3/0053* (2013.01); *Y02T 90/34* (2013.01); *H01M 16/006* (2013.01); *B60L 3/003* (2013.01); *H01M 8/04559* (2013.01); *Y02E 60/50* (2013.01); *H01M 8/04686* (2013.01)
USPC ............ 429/430; 429/428; 429/431; 429/432

(58) Field of Classification Search
CPC ............. B60L 3/0053; B60L 11/1881; H01M 8/04664; H01M 8/04671; H01M 8/04679
USPC .............................. 307/43; 429/428, 430–432
See application file for complete search history.

(56) References Cited

U.S. PATENT DOCUMENTS

2007/0040536 A1* 2/2007 Smith et al. .................. 323/280
2008/0238383 A1* 10/2008 Watanabe et al. ............. 323/271
2009/0117427 A1* 5/2009 Manabe et al. ................. 429/23

FOREIGN PATENT DOCUMENTS

| JP | 2005-332702 A | 12/2005 |
|----|---------------|---------|
| JP | 2006-087293 A | 3/2006  |
| JP | 2007-012418 A | 1/2007  |
| JP | 2008-053162 A | 3/2008  |

OTHER PUBLICATIONS

Internation Search Report Sep. 1, 2009.*
International Search Report issued Sep. 1, 2009 of PCT/JP2009/060446.

* cited by examiner (Continued)

Primary Examiner — Rexford Barnie
Assistant Examiner — Rasem Mourad
(74) Attorney, Agent, or Firm — Kenyon & Kenyon LLP

(57) ABSTRACT

The present invention detects a failure in an FC converter. A target voltage determination section determines an output target voltage for a fuel cell. A superimposition signal generation section generates a predetermined reference signal to be superimposed onto the output target voltage. A voltage command signal generation section generates a voltage command signal by superimposing the reference signal onto the output target voltage. A frequency characteristics calculation section calculates the frequency characteristics of the reference signal component superimposed on the output voltage of the fuel cell. A failure judgment section judges that a failure occurs in the FC converter if a value of the calculated frequency characteristics is less than the lower limit threshold value of an allowable range established based on reference characteristics. A gain adjustment section adjusts the gains in the FC converter so that the frequency characteristics calculated by the frequency characteristics calculation section correspond to the reference characteristics.

4 Claims, 2 Drawing Sheets

FUEL CELL SYSTEM

This is a 371 national phase application of PCT/JP2009/060446 filed 8 Jun. 2009, the contents of which are incorporated herein by reference.

TECHNICAL FIELD

The present invention relates to a fuel cell system.

BACKGROUND ART

Patent Document 1 indicated below discloses a fuel cell system which measures an AC impedance by superimposing a sinusoidal wave onto the output voltage of a fuel cell using a DC-DC converter serving as a voltage conversion unit, and detecting any variation of the sinusoidally-varying power. In this fuel cell system, if the DC-DC converter shows an abnormality, the superimposition of a sinusoidal wave onto the fuel cell output voltage is set so as to be performed by changing the output current of an inverter.

PRIOR ART REFERENCE(S)

Patent Document(s)

Patent Document 1: Japanese laid-open patent publication No. 2008-53162

DISCLOSURE OF THE INVENTION

Problem to be Solved by the Invention

Patent Document 1 above has no disclosure about a means for detecting a failure in the DC-DC converter.

The present invention has been made to solve the above problem present in the prior art, and is aimed at providing a fuel cell system that can detect a failure in a voltage conversion unit.

Means for Solving the Problem

In order to solve the above problem, a fuel cell system according to the invention has: a fuel cell; a power storage unit that can be charged with electric power generated by the fuel cell; a power consuming device that consumes electric power from the fuel cell and from the power storage unit; a voltage conversion unit placed between the fuel cell and the power consuming device or between the power storage unit and the power consuming device; signal generation means that generates an output command signal by superimposing a predetermined reference signal onto an output target signal for the fuel cell; calculation means that calculates frequency characteristics of the reference signal component contained in an output signal output from the fuel cell according to the output command signal generated by the signal generation means; and judgment means that judges that a failure occurs in the voltage conversion unit if a value of the frequency characteristics calculated by the calculation means is less than a lower limit threshold value of an allowable range established based on reference characteristics, the reference characteristics being frequency characteristics of the reference signal.

With this invention, a predetermined reference signal is superimposed onto the output target signal for the fuel cell, and the reference signal component can consequently be incorporated in the output signal output from the fuel cell. Accordingly, if a value of the frequency characteristics calculated based on the reference signal component is below the lower limit threshold value of the allowable range established based on the reference characteristics, which are the frequency characteristics of the reference signal, such degradation in characteristics can be judged as being due to a failure in the voltage conversion unit.

The above fuel cell system may further have an adjustment means that adjusts a gain in the voltage conversion unit so that the frequency characteristics calculated by the calculation means correspond to the reference characteristics.

With the above, the ability to maintain the system properties in an optimal state regardless of unpredictable variations, such as errors in design or changes over time, of the components that constitute the voltage conversion unit, in other words, so-called robustness can be improved.

In the above fuel cell system, the frequency characteristics and the reference characteristics may be amplitude characteristics and/or phase characteristics. Also, in the above fuel cell system, the output signal may be a signal indicating an output voltage of the fuel cell and/or a signal indicating an output current of the fuel cell.

In the above system, the reference signal may be a sinusoidal wave. As a result, a signal that does not affect other controls performed in the fuel cell system can be superimposed.

Effect of the Invention

According to the invention, a failure in a voltage conversion unit can be detected.

MODE FOR CARRYING OUT THE INVENTION

A preferred embodiment of the fuel cell system according to the invention will be described below with reference to the attached drawings. This embodiment explains the case where the fuel cell system according to the invention is used as an on-vehicle power generation system for a fuel cell vehicle (FCHV: Fuel Cell Hybrid Vehicle). Note that the fuel cell system according to the invention can also be utilized in various mobile objects other than fuel cell vehicles (robots, ships, planes, etc.), and can also be utilized in stationary power generation systems used as power generation equipment for structures (houses, buildings, etc.).

Figure 1:
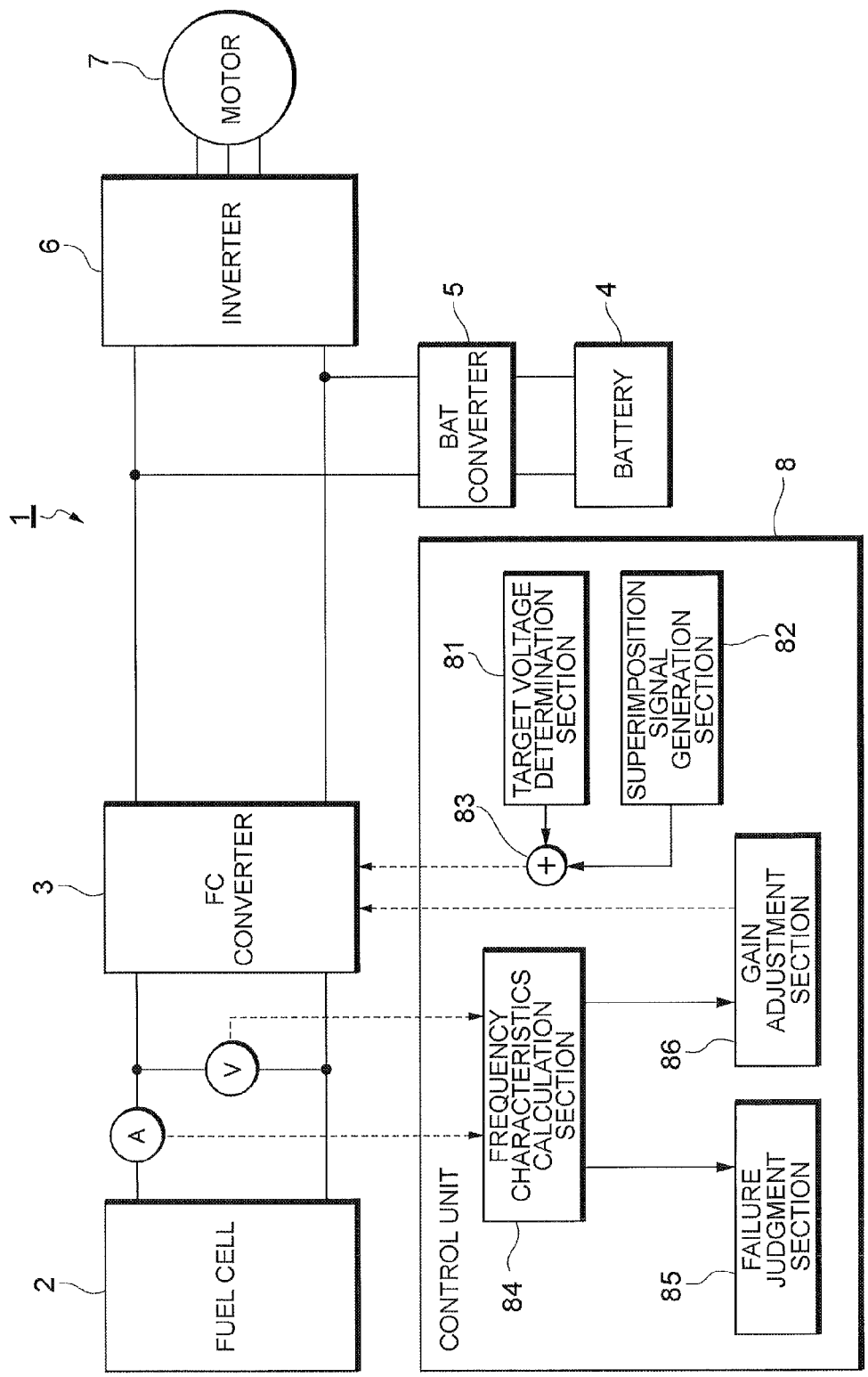
FIG. 1 is a diagram schematically illustrating the configuration of a fuel cell system according to an embodiment.

First referring to FIG. 1, the configuration of the fuel cell system of this embodiment will be described. FIG. 1 is a diagram schematically illustrating the fuel cell system of this embodiment.

As shown in FIG. 1, a fuel cell system 1 has: a fuel cell 2 that generates electric power through an electrochemical reaction between reactant gases, i.e., oxidant gas and fuel gas; a DC/DC converter 3 (voltage conversion unit, hereinafter referred to as a "FC converter") for the fuel cell; a battery 4 (power storage unit) that functions as a secondary battery; a DC/DC converter 5 (voltage conversion unit, hereinafter referred to as a "Bat converter") for the battery; a traction inverter 6 and a traction motor 7 (power consuming devices) that act as loads; and a control unit 8 that performs overall control of the entire system. The set of the fuel cell 2 and the FC converter 3 and the set of the battery 4 and the Bat converter 5 are respectively connected in parallel with the traction inverter 6 and the traction motor 7.

The fuel cell 2 is, for example, a polymer electrolyte fuel cell, having a stack structure of a number of stacked unit cells. Each unit cell is configured to have: an air electrode on one surface of an electrolyte formed of an ion-exchange membrane; a fuel electrode on the other surface; and a pair of separators that sandwich the air electrode and fuel electrode between them. Electric power is generated when: hydrogen gas is supplied to a hydrogen gas path of one separator; oxidant gas is supplied to an oxidant gas path of the other separator; and those reactant gases react chemically.

The FC converter 3 is a direct current voltage converter, and has a function of increasing a direct current voltage output from the fuel cell 2 and outputting the increased voltage to the traction inverter 6, which is a power consuming device side. With this FC converter 3, the output voltage of the fuel cell 2 is controlled. Provided on the input side of the FC converter 3 are a voltage sensor V that detects the output voltage of the fuel cell 2 and a current sensor A that detects the output current of the fuel cell 2.

The battery 4 is formed of stacked battery cells and provides a certain high voltage serving as a terminal voltage, and under the control of a battery computer not shown in the drawing, the battery 4 can be charged with the surplus power of the fuel cell 2 and provide supplemental power supply.

The Bat converter 5 is a direct current voltage converter, and has: a function of increasing a direct current voltage input from the battery 4 and outputting the increased voltage to the traction inverter 6, which is the power consuming device side; and a function of decreasing a direct current voltage input from the fuel cell 2 or the traction motor 7 and outputting the decreased voltage to the battery 4. With the above functions of the Bat converter 5, the battery 4 can be charged or discharged.

The traction inverter 6 converts a direct current to a three-phase alternating current, and supplies it to the traction motor 7. The traction motor 7 is, for example, a three-phase alternating current motor, and constitutes the major power source of the fuel cell vehicle equipped with the fuel cell system 1.

The control unit 8 detects the amount of operation of an accelerating member (e.g., accelerator) provided in the fuel cell vehicle, receives control information, such as a required amount of acceleration (for example, a power generation amount required by a power consuming device, such as the traction motor 7), and controls the operation of various devices in the system. Examples of the power consuming device may include, in addition to the traction motor 7, auxiliary devices necessary for the operation of the fuel cell 2, actuators used in various devices related to the driving of a vehicle (a speed change gear, wheel controller, steering device, suspension, etc.), and an air conditioning device (air conditioner), lighting system, audio system, etc., for the passenger space.

The control unit 8 physically has, for example, a CPU, memory and I/O interfaces. The memory includes a ROM for storing control programs and control data processed by the CPU, and a RAM mainly used as various work areas for control processing. These components are connected to each other via a bus. The I/O interfaces are connected to various sensors including the voltage sensor V and the current sensor A, and various drivers for driving the traction motor 7, etc.

In accordance with the control programs stored in the ROM, the CPU receives the detection results of the various sensors through the I/O interfaces, processes them using various data, etc., in the RAM, and thereby performs various types of control processing in the fuel cell system 1. Also, by outputting control signals to the various drivers through the I/O interfaces, the CPU controls the entire fuel cell system 1. Of the various types of control processing performed by the control unit 8, FC converter failure judgment processing, which is a distinctive feature of this embodiment, will be explained below.

The control unit 8 functionally has: a target voltage determination section 81; a superimposition signal generation section 82; a voltage command signal generation section 83; a frequency characteristics calculation section 84 (calculation means); a failure judgment section 85 (judgment means); and a gain adjustment section 86 (adjustment means). The target voltage determination section 81, the superimposition signal generation section 82 and the voltage command signal generation section 83 constitute a signal generation means.

The target voltage determination section 81 determines an output target voltage for the fuel cell 2 in accordance with various sensor signals input from an accelerator pedal sensor (not shown in the drawing), etc., and outputs the determined output target voltage to the voltage command signal generation section 83.

The superimposition signal generation section 82 generates a predetermined reference signal to be superimposed onto the output target voltage, and outputs the reference signal to the voltage command signal generation section 83. As the predetermined reference signal, any signal that does not affect other controls performed in the fuel cell system 1 may be used. Specific examples include a sinusoidal wave signal of a specific frequency that exhibits an amplitude of several volts. The amplitude of the reference signal may arbitrarily be changed by a superimposition signal amplitude controlling section (not shown in the drawing). Also, various parameters (type of waveform, frequency, amplitude) of the output target voltage and the reference signal may arbitrarily be determined according to the system design, etc.

The voltage command signal generation section 83 superimposes the reference signal onto the output target voltage, and outputs the resulting signal to the FC converter 3 as a voltage command signal. The FC converter 3 controls the voltage of the fuel cell 2 in accordance with the above voltage command signal.

The frequency characteristics calculation section 84 calculates the frequency characteristics of the reference signal component superimposed onto the output voltage of the fuel cell 2. The frequency characteristics include amplitude characteristics and phase characteristics. The frequency characteristics can be calculated with a known frequency characteristic analysis process. The amplitude characteristics or the phase characteristics alone may be employed as the frequency characteristics.

The failure judgment section 85 judges that a failure occurs in the FC converter 3 if a value of the frequency characteristics calculated by the frequency characteristics calculation section 84 is less than the lower limit threshold value of an allowable range which is established based on reference characteristics, the reference characteristics being the frequency characteristics of the reference signal. The allowable range may be, for example, the range of the amplitude or phase that the reference signal component output from the fuel cell 2 may have when the FC converter 3 works well.

More specifically, for example, if the calculated frequency characteristics include an amplitude smaller than the lower limit threshold value of the allowable range set according to the reference signal amplitude, or if the calculated frequency characteristics include a phase with a delay greater than the lower limit threshold value of the allowable range set according to the reference signal phase, the failure judgment section 85 judges that a failure occurs in the FC converter 3. The reference characteristics and the allowable ranges are calculated by experiments, etc., and stored in memory in advance.

If the failure judgment section 85 judges that a failure occurs in the FC converter 3, the failure judgment section 85 turns on a warning light on a display panel, the warning light indicating that there is a failure. The way to inform the driver, etc., of the failure is not limited to the above. For example, a warning message may be displayed on a display panel, and a warning tone may be output through a loudspeaker.

The gain adjustment section 86 adjusts the gains in the FC converter 3 so that the frequency characteristics calculated by the frequency characteristics calculation section 84 correspond to the reference characteristics. As a result, the ability to maintain the system properties in an optimal state regardless of unpredictable variations, such as errors in design or changes over time, of the components of the FC converter 3, in other words, so-called robustness, can be improved.

Figure 2:
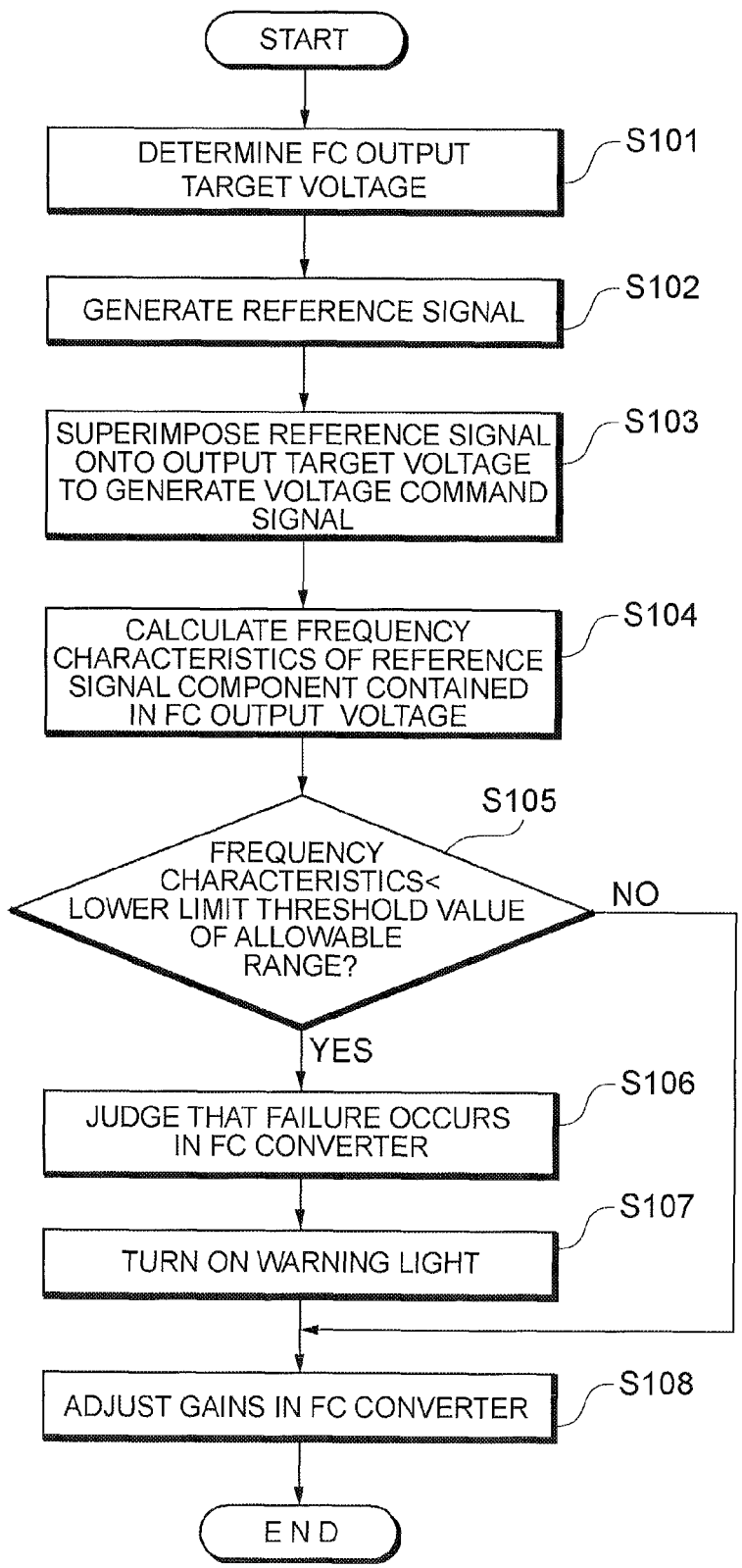
FIG. 2 is a flowchart for explaining FC converter failure judgment processing according to an embodiment.

Next, the steps of the FC converter failure judgment processing of this embodiment will be described with reference to the flowchart shown in FIG. 2. This FC converter failure judgment processing is started, for example, when an ignition key is turned on, and the processing is performed repeatedly until the operation stops.

First, the target voltage determination section 81 of the control unit 8 determines an output target voltage for the fuel cell 2 in accordance with various sensor signals input from the accelerator pedal sensor, etc. (step S101).

After that, the superimposition signal generation section 82 of the control unit 8 generates a predetermined reference signal to be superimposed onto the output target voltage (step S102).

After that, the voltage command signal generation section 83 of the control unit 8 generates a voltage command signal by superimposing the reference signal onto the output target voltage (step S103). The FC converter 3 controls the voltage of the fuel cell 2 according to the voltage command signal.

After that, the frequency characteristics calculation section 84 of the control unit 8 calculates the frequency characteristics of the reference signal component superimposed on the output voltage of the fuel cell 2 (step S104).

After that, the failure judgment section 85 of the control unit 8 judges whether or not a value of the frequency characteristics calculated at step S104 above is less than the lower limit threshold value of the allowable range which is established in accordance with the reference characteristics stored in memory (step S105). If the result of the above judgment is NO (step S105; NO), the control unit 8 shifts the processing to step S107 explained below.

If a value of the calculated frequency characteristics is judged in step S105 as being less than the lower limit threshold value of the allowable range (step S105; YES), the failure judgment section 85 of the control unit 8 judges that a failure occurs in the FC converter 3 (step S105), and turns on a warning light on a display panel, the light indicating that there is a failure (step S106).

After that, the gain adjustment section 86 of the control unit 8 adjusts the gains in the FC converter 3 so that the frequency characteristics calculated by the frequency characteristics calculation section 84 correspond to the reference characteristics (step S107).

As described above, according to the fuel cell system 1 of this embodiment, a predetermined reference signal that does not affect other controls performed in the fuel cell system 1 is superimposed onto the output target voltage for the fuel cell 2, and the reference signal component can consequently be incorporated in the output voltage output from the fuel cell. Thus, if a value of the frequency characteristics calculated based on the above reference signal component is below the lower limit threshold value of the allowable range established based on the reference characteristics, which are the frequency characteristics of the reference signal, such degradation in characteristics can be judged as being due to a failure in the FC converter 3. In other words, the fuel cell system 1 of this embodiment can detect a failure in the FC converter 3.

In the above-described embodiment, various processes are performed using signals concerning the output voltage of the fuel cell; however, the invention is not limited to the above, and the processes may be performed using signals concerning the output current of the fuel cell. In that case, the control unit 8 may generate a current command signal by superimposing a reference signal onto an output target current, and calculate the frequency characteristics of the reference signal component superimposed onto the output current of the fuel cell 2.

In the above-described embodiment, the target voltage determination section 81, superimposition signal generation section 82, voltage command signal generation section 83, frequency characteristics calculation section 84, failure judgment section 85 and gain adjustment section 86 are described as a set of functions of the control unit 8; however, this description does not mean that the control device to which each function is physically assigned is limited to just one device. In other words, each function may be separately assigned to several control devices. In addition, one or more control devices may be provided separately from the respective components of the fuel cell system 1, and some or all of the control devices may be incorporated in any of the components of the fuel cell system 1, e.g., the FC converter 3.

Also, the fuel cell system 1 in the above-described embodiment may be provided with an external signal generation section and a frequency response analysis (FRA) section, whereby the ability of the FC converter 3 to superimpose signals may be measured. More specifically, by superimposing an external signal provided from the external signal generation section onto the detection signal of the voltage sensor V or the current sensor A, and analyzing the response characteristics with respect to the superimposed signal by the frequency response analysis section, the ability of the FC converter 3 to superimpose signals can be measured. The external signal generation section and the frequency response analysis section may respectively be a known signal generator and a known frequency response analyzer.

Also, the above embodiment explains the case where the invention is applied to the FC converter 3; however, the invention is not limited to the above, and may be applied to the Bat converter 5 as well.

INDUSTRIAL APPLICABILITY

The fuel cell system according to the invention is suited for use in detecting a failure in a voltage conversion unit.

DESCRIPTION OF REFERENCE NUMERALS

1 . . . . Fuel cell system; 2 . . . . Fuel cell; 3 . . . FC converter; 4 . . . . Battery; 5 . . . . Bat converter; 6 . . . . Traction inverter; 7 . . . . Traction motor; 8 . . . . Control unit; 81 . . . . Target voltage determination section; 82 . . . . Superimposition signal generation section; 83 . . . . Voltage command signal generation section; 84 . . . . Frequency characteristics calculation section; 85 . . . . Failure judgment section; 86 . . . . Gain adjustment section; V . . . . Voltage sensor; and A . . . . Current sensor.

The invention claimed is:

1. A fuel cell system comprising:

a fuel cell;

a power storage unit that can be charged with electric power generated by the fuel cell;

a power consuming device that consumes electric power from the fuel cell and from the power storage unit;

a voltage conversion unit placed between the fuel cell and the power consuming device or between the power storage unit and the power consuming device;

a signal generation unit programmed to generate an output command signal by superimposing a first sinusoidal wave signal onto an output target signal for the fuel cell;

a calculation unit programmed to calculate frequency characteristics of a second sinusoidal wave superimposed onto an output value contained in an output signal output from the fuel cell according to the output command signal generated by the signal generation unit; and a judgment unit programmed to judge that a failure occurs in the voltage conversion unit if a value of the frequency characteristics calculated by the calculation unit is less than a lower limit threshold value of an allowable range established based on frequency characteristics of the first sinusoidal wave signal.

2. The fuel cell system according to claim 1, further comprising an adjustment unit programmed to adjust a gain in the voltage conversion unit so that the frequency characteristics calculated by the calculation unit correspond to the frequency characteristics of the first sinusoidal wave signal.

3. The fuel cell system according to claim 1, wherein the frequency characteristics are amplitude characteristics and/or phase characteristics.

4. The fuel cell system according to claim 1, wherein the output value contained in the output signal is an output voltage value of the fuel cell and/or an output current value of the fuel cell.

* * * * *